US012671133B2

(12) United States Patent

He et al.

(10) Patent No.: US 12,671,133 B2

(45) Date of Patent: Jun. 30, 2026

(54) BATTERY PACK COMPRISING GAP BETWEEN ADJACENT CELLS AND ELECTRIC VEHICLE

(71) Applicant: BYD COMPANY LIMITED, Shenzhen (CN)

(72) Inventors: Long He, Shenzhen (CN); Huajun Sun, Shenzhen (CN); Shichao Hu, Shenzhen (CN); Zhiyong Ao, Shenzhen (CN); Yan Zhu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 1022 days.

(21) Appl. No.: 17/792,658

(22) PCT Filed: Jan. 4, 2021

(86) PCT No.: PCT/CN2021/070151

§ 371 (c)(1),
(2) Date: Jul. 13, 2022

(87) PCT Pub. No.: WO2021/143561

PCT Pub. Date: Jul. 22, 2021

(65) Prior Publication Data

US 2023/0040013 A1 Feb. 9, 2023

(30) Foreign Application Priority Data

Jan. 13, 2020 (CN) .......................... 202010033795.1

(51) Int. Cl.
H01M 50/249 (2021.01)
H01M 50/224 (2021.01)
(Continued)

(52) U.S. Cl.
CPC ......... H01M 50/24 (2021.01); H01M 50/224 (2021.01); H01M 50/249 (2021.01);
(Continued)

(58) Field of Classification Search
CPC .. H01M 50/24; H01M 50/224; H01M 50/249; H01M 50/271; H01M 50/394; H01M 50/51; H01M 2220/20
See application file for complete search history.

(56) References Cited

U.S. PATENT DOCUMENTS

| | | | | | |
|---|---|---|---|---|---|
| 5,322,745 | A | * | 6/1994 | Yanagihara | ......... H01M 10/651 429/159 |
| 2011/0244315 | A1 | * | 10/2011 | Yoon | ................... H01M 50/636 156/146 |

(Continued)

FOREIGN PATENT DOCUMENTS

| | | | |
|---|---|---|---|
| CN | 201655905 U | * | 11/2010 |
| CN | 201766132 U | * | 3/2011 |

(Continued)

OTHER PUBLICATIONS

EPO machine generated English translation of KR-20190120565-A (Year: 2019).*

(Continued)

*Primary Examiner* — Kimberly Wyluda

(74) *Attorney, Agent, or Firm* — Calfee, Halter & Griswold LLP

(57) ABSTRACT

A battery pack and an electric vehicle are provided. The battery pack includes a battery sequence. The battery sequence includes multiple cells. A thickness of each cell extends along a first direction. The multiple cells are arranged in sequence along the first direction to form the battery sequence. At least one of the cells includes a metal shell and an electrode core packaged in the metal shell. An air pressure inside the metal shell is lower than an air pressure outside the metal shell. A gap is provided between at least two adjacent cells. A ratio of the gap to the thickness of the cell ranges from 0.001 to 0.15.

29 Claims, 4 Drawing Sheets

(51) Int. Cl.

| | | |
|---|---|---|
| *H01M 50/24* | (2021.01) | |
| *H01M 50/271* | (2021.01) | |
| *H01M 50/30* | (2021.01) | |
| *H01M 50/51* | (2021.01) | |

(52) U.S. Cl.
CPC ....... *H01M 50/271* (2021.01); *H01M 50/394* (2021.01); *H01M 50/51* (2021.01); *H01M 2220/20* (2013.01)

(56) References Cited

U.S. PATENT DOCUMENTS

| | | | | |
|---|---|---|---|---|
| 2011/0305948 A1* | 12/2011 | Miyatake | .............. | H01M 4/668 |
| | | | | 252/511 |
| 2012/0114993 A1* | 5/2012 | Park | ................... | H01M 50/271 |
| | | | | 429/88 |
| 2013/0236773 A1* | 9/2013 | Nagata | ................ | H01M 50/119 |
| | | | | 429/179 |
| 2018/0138470 A1 | 5/2018 | Park | | |
| 2018/0175346 A1 | 6/2018 | Schmid-Schobein | | |
| 2019/0355940 A1* | 11/2019 | Satou | ................ | H01M 50/103 |
| 2022/0352591 A1* | 11/2022 | Chi | .................... | H01M 50/264 |

FOREIGN PATENT DOCUMENTS

| | | | |
|---|---|---|---|
| CN | 102104167 A | * | 6/2011 |
| CN | 103094511 A | | 5/2013 |
| CN | 105474431 A | | 4/2016 |
| CN | 105914389 A | | 8/2016 |
| CN | 207637864 A | | 7/2018 |
| CN | 108780856 A | | 11/2018 |
| CN | 110268550 A | | 9/2019 |
| CN | 110518156 A | | 11/2019 |
| CN | 110518174 A | | 11/2019 |
| CN | 110571366 A | | 12/2019 |
| CN | 110828744 A | | 2/2020 |
| CN | 110828745 A | | 2/2020 |
| CN | 110828746 A | | 2/2020 |
| EP | 3528312 A1 | | 8/2019 |
| JP | 2012146588 A | | 8/2012 |
| JP | 2013076911 A | | 4/2013 |
| JP | 2017168439 A | | 9/2017 |
| KR | 20190120565 A | * | 10/2019 .......... H01M 2/0275 |
| WO | 2016204147 A1 | | 12/2016 |

OTHER PUBLICATIONS

EPO machine generated English translation of CN-201655905-U (Year: 2010).*

EPO machine generated English translation of CN-201766132-U (Year: 2011).*

EPO machine generated English translation of CN-102104167-A (Year: 2011).*

English Translation of International Search Report from PCT/CN2021/070151 dated Mar. 26, 2021 (3 pages).

* cited by examiner

BATTERY PACK COMPRISING GAP BETWEEN ADJACENT CELLS AND ELECTRIC VEHICLE

CROSS-REFERENCE TO RELATED APPLICATIONS

The present disclosure is the National Stage of the PCT International Application No. PCT/CN2021/070151, filed on Jan. 4, 2021, which claims priority to Chinese Patent Application No. 202010033795.1, filed by the BYD Co., Ltd. On Jan. 13, 2020 and entitled "BATTERY PACK AND ELECTRIC VEHICLE".

FIELD

The present disclosure belongs to the field of batteries, and more specifically, to a battery pack and an electric vehicle.

BACKGROUND

An existing battery pack applicable to electric vehicles generally includes multiple cells to increase a battery capacity. The multiple cells are mounted in a housing of the battery pack.

In the related art, in order to increase a capacity of a cell, multiple electrode cores are connected in series in a housing of the cell. In case of vibration and turbulence, the multiple electrode cores tend to move arbitrarily in the shell, and displacement of the electrode cores relative to each other tends to occur, causing damage to the electrode cores. For example, a current collector is damaged, a separator film is wrinkled, an active material layer on a plate is peeled off, stability of the cell relatively poor, and safety events tend to occur. In addition, the cell will swell, resulting in a safety problem.

SUMMARY

The present disclosure is intended to resolve one of technical problems in the related art at least to some extent.

A first aspect of the present disclosure provides a battery sequence. The battery sequence includes multiple cells.

A thickness of each cell extends along a first direction. The multiple cells are arranged in sequence along the first direction to form the battery sequence. At least one of the cells includes a metal shell and an electrode core packaged in the metal shell. An air pressure inside the metal shell is lower than an air pressure outside the metal shell. A gap is provided between at least two adjacent cells. A ratio of the gap to the thickness of the cell ranges from 0.001 to 0.15.

In some implementations of the present disclosure, the air pressure inside the metal shell ranges from −100 Kpa to −5 Kpa.

In some implementations of the present disclosure, the air pressure inside the metal shell ranges from −90 Kpa to −20 Kpa.

In some implementations of the present disclosure, a thickness of the metal shell ranges from 0.05 mm to 1 mm.

In some implementations of the present disclosure, the metal shell includes a shell body with an opening and an end cover. The end cover is hermetically connected with the opening of the shell body to jointly define a hermetical accommodating chamber. The electrode core is arranged in the accommodating chamber. The gap between the two adjacent cells includes a first gap. The first gap is a minimum distance between the two end covers of the two adjacent cells along the first direction. The thickness of the cell is a dimension of the end cover along the first direction. A ratio of the first gap to the thickness of the cell ranges from 0.005 to 0.1.

In some implementations of the present disclosure, the metal shell includes a shell body with an opening and an end cover. The end cover is hermetically connected with the opening of the shell body to jointly define a hermetical accommodating chamber. The electrode core is arranged in the accommodating chamber. The shell body has two opposite first surfaces along the first direction. The gap between the two adjacent cells includes a second gap. The second gap is a minimum distance between the two first surfaces of the shell bodies of the two adjacent cells facing each other. The thickness of the cell is a dimension of the end cover along the first direction.

In some implementations of the present disclosure, the second gap between the cells before use is larger than the second gap between the cells after use.

In some implementations of the present disclosure, the metal shell has two opposite first surfaces along the first direction. At least one of the first surfaces is recessed into the metal shell.

In some implementations of the present disclosure, the two first surfaces are both recessed into the metal shell. The metal shell is pressed against an outer surface of the electrode core along the first direction to hold the electrode core.

In some implementations of the present disclosure, a gap is provided between the electrode core and an inner surface of the metal shell before the metal shell is vacuumized. The metal shell is pressed against the outer surface of the electrode core along the first direction to hold the electrode core after the metal shell is vacuumized.

In some implementations of the present disclosure, multiple electrode cores are packaged in the metal shell. The multiple electrode cores are divided into multiple electrode core assemblies. The electrode core assemblies are connected in series.

In some implementations of the present disclosure, a length of the cell extends along a second direction. The length of the cell ranges from 400 mm to 2500 mm. The multiple electrode core assemblies are arranged along the second direction. A length of each electrode core assembly extends along the second direction. The electrode core assembly includes a first electrode and a second electrode configured to lead out a current. The first electrode and the second electrode are respectively arranged on two sides of the electrode core assembly along the second direction.

In some implementations of the present disclosure, the electrode core assemblies are connected in series to form an electrode core string. The first electrode of one of the two electrode core assemblies respectively arranged on a head end and a tail end of the electrode core string and the second electrode of the other of the electrode core assemblies are respectively led out along the second direction through two ends of the metal shell.

In some implementations of the present disclosure, the thickness D of the cell is greater than 10 mm.

In some implementations of the present disclosure, the thickness of the cell ranges from 13 mm to 75 mm.

In some implementations of the present disclosure, a packaging film is further arranged between the metal shell and the electrode core. The electrode core is packaged in the packaging film.

In some implementations of the present disclosure, multiple electrode cores are arranged. The multiple electrode cores are divided into multiple electrode core assemblies. One packaging film is arranged. The electrode core assemblies are connected in series. The multiple electrode core assemblies connected in series are packaged in the one packaging film. Each electrode core assembly includes an electrode core assembly body and a first electrode and a second electrode configured to lead out a current. A joint of the first electrode of one of two electrode core assemblies connected in series and the second electrode of the other of the electrode core assemblies is arranged in the packaging film.

In some implementations of the present disclosure, a packaging portion is formed on the packaging film at a position corresponding to the first electrode and/or the second electrode to isolate two adjacent electrode core assembly bodies. At least one of the first electrode of one of two adjacent electrode core assemblies and the second electrode of the other of the electrode core assemblies is arranged in the packaging portion.

In some implementations of the present disclosure, multiple electrode cores are arranged. The multiple electrode cores are divided into multiple electrode core assemblies. Multiple packaging films are arranged. One electrode core assembly is packaged in each packaging film to form an electrode core assembly. The electrode core assemblies are connected in series.

In some implementations of the present disclosure, an air pressure between the metal shell and the packaging film is P1. An air pressure inside the packaging film is P2. P1 and P2 satisfy: $P1>P2$. $P1/P2$ ranges from 0.05 to 0.85.

In some implementations of the present disclosure, a value of P1 ranges from $-100$ Kpa to $-5$ Kpa. A value of P2 ranges from $-100$ Kpa to $-20$ Kpa.

In some implementations of the present disclosure, the value of P1 ranges from $-75$ Kpa to $-20$ Kpa.

In some implementations of the present disclosure, the packaging film includes a non-metallic outer film layer and a non-metallic inner film layer that are stacked. The outer film layer is arranged between the metal shell and the inner film layer. A melting point of the outer film layer is greater than a melting point of the inner film layer. A difference between the melting point of the outer film layer and the melting point of the inner film layer ranges from 30° C. to 80° C.

In some implementations of the present disclosure, the outer film layer is made of one or a combination of more than one of polyethylene terephthalate, polyamide, or polypropylene. The inner film layer is made of one or a combination of more than one of polypropylene, polyethylene, or polyethylene terephthalate.

In some implementations of the present disclosure, the outer film layer is bonded to the inner film layer.

In some implementations of the present disclosure, a binder for the bonding is a polyolefin binder.

In some implementations of the present disclosure, the packaging film is an aluminum-plastic film.

In some implementations of the present disclosure, an exhaust hole is provided on the metal shell. A sealing member is arranged in the exhaust hole.

In some implementations of the present disclosure, the battery pack further includes a battery pack cover and a tray. The battery pack cover and the tray are connected to form a battery accommodating cavity. The battery sequence is arranged in the battery accommodating cavity. The tray includes a support member. A support region is formed on the metal shell. The cell is butted with the support member through the support region and is supported on the support member.

In some implementations of the present disclosure, the tray includes a side beam. The side beam is a support member. Two ends of the cell along the second direction are supported on the side beam.

A second aspect of the present disclosure provides an electric vehicle, including the battery pack according to any of the above implementations.

the present disclosure has the following beneficial effects compared with the related art: The battery pack of the present disclosure includes the multiple cells, each cell includes the metal shell and the electrode core packaged in the metal shell, the air pressure in the metal shell is caused to be lower than the air pressure outside the metal shell, that is, the inside of the metal shell is in a negative pressure state, and a housing of a battery is arranged as close as possible to the internal electrode core, to reduce an internal gap, thereby preventing the electrode core from moving arbitrarily in the metal shell and preventing relative displacement between the electrode cores, and reducing damage to a current collector, wrinkling of a separator film, falling off of active materials, and the like. In this way, mechanical strength of the entire battery is improved, a service life of the battery is prolonged, and safety of the battery is enhanced. In addition, in this method of the present disclosure, multiple electrode cores can be packaged in a metal shell, so that a relatively long cell can be manufactured more conveniently. Therefore, by using the solution of the present disclosure, a relatively long cell with relatively large strength can be easily realized. Thus, when the cell is mounted in a housing of the battery pack, support structures such as cross bars and longitudinal bars required in the battery pack body can be reduced, and the cell is directly mounted to the housing of the battery pack and supported by itself, thereby reducing a space occupied in an internal space of the battery pack, improving a volume utilization of the battery pack, and helping reduce a weight of the battery pack. In addition, a certain gap is reserved between the cells according to the thickness of the cell. The gap can be used as a heat dissipation channel for the battery pack, thereby improving heat dissipation efficiency of the battery pack, and can provide a cushion space for expansion of the cells, thereby significantly enhancing safety of the battery pack.

Additional aspects and advantages of the present disclosure will be given in the following description, some of which will become apparent from the following description or may be learned from practices of the present disclosure.

5

6

Figure 6:
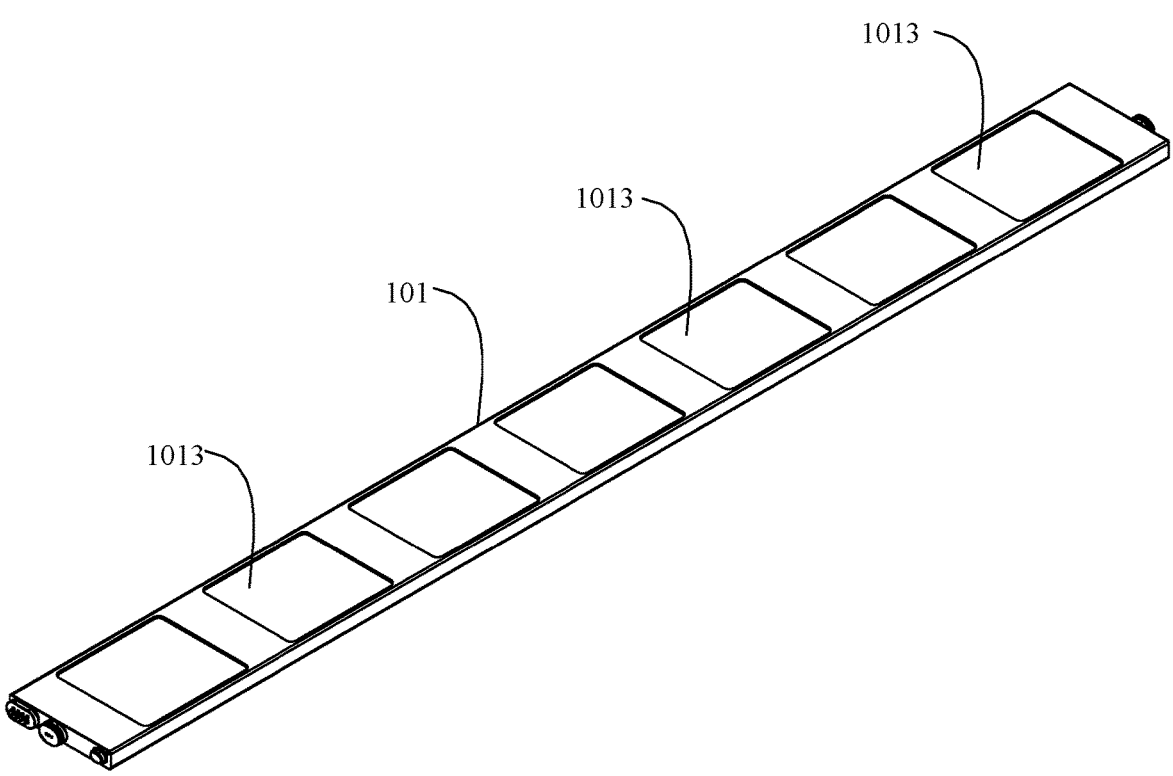

FIG. 6 is a schematic structural diagram of a surface of the metal shell of the cell with recesses according to an implementation of the present disclosure.

Figures 7, 8:
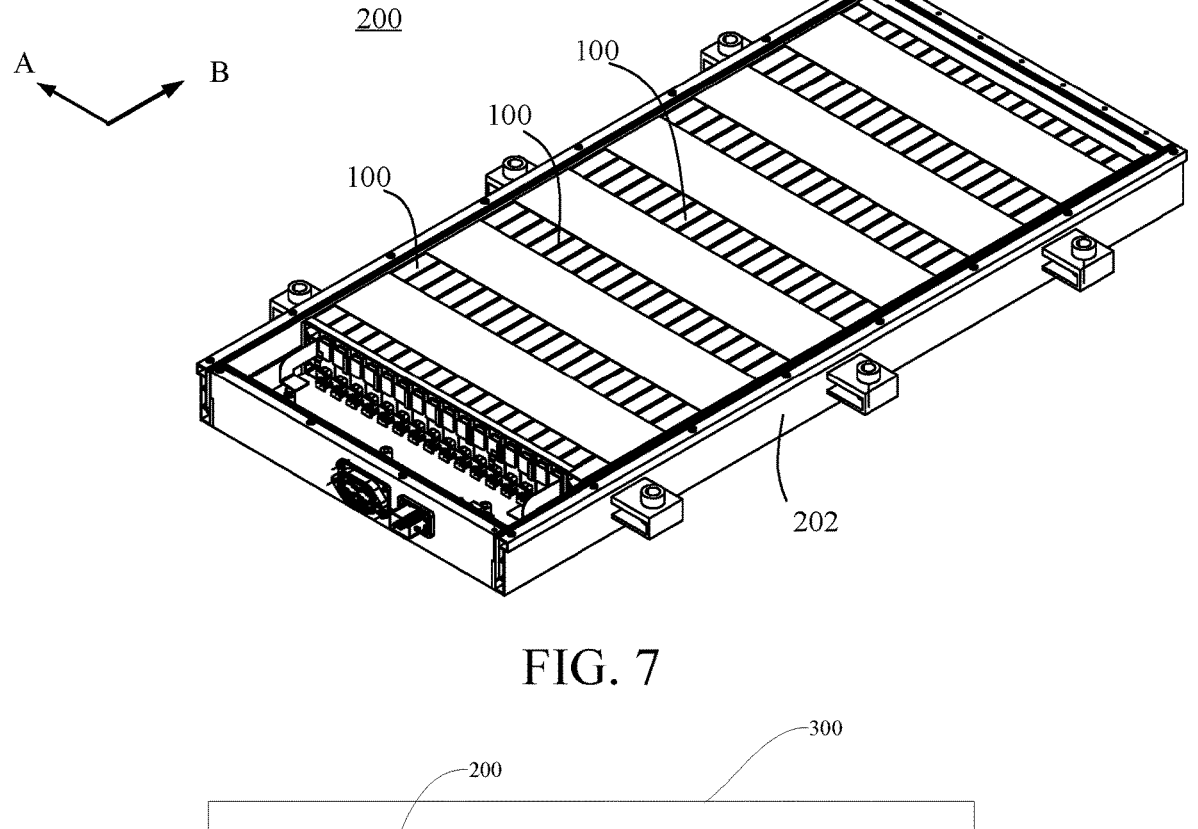

FIG. 7 is a schematic structural diagram of a battery pack according to an implementation of the present disclosure.

FIG. 8 is a schematic relationship diagram between an electric vehicle and the battery pack according to an implementation of the present disclosure.

REFERENCE NUMERALS

100. Cell;
101. Metal shell; 1011. Cover plate; 1012. Shell body; 1013. Recessed region;
102. Electrode core; 1021. First electrode; 1022. Second electrode; 1023. Electrode core assembly; 1024: Electrode core assembly body;
103. Packaging film; 1031. Packaging portion; 200. Battery pack; 201. Battery sequence; 202. Tray;
300. Electric vehicle;
D: Thickness of cell;
L: Length of cell;
S. First gap;
A. First direction; B: Second direction.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary and used only for explaining the present disclosure, and should not be construed as a limitation on the present disclosure.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "axial direction", "radial direction", and "circumferential direction" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure.

As shown in FIG. 1 to FIG. 8, the present disclosure provides a battery pack 200, including a battery sequence 201. The battery sequence 201 includes multiple cells 100. A thickness of each cell 100 extends along a first direction A. The multiple cells 100 are arranged in sequence along the first direction A to form the battery sequence 201. In other words, the multiple cells 100 are arranged into the battery sequence 201 along a thickness direction of the cells.

One or more battery sequences 201 may be arranged, and one or more cells 100 may be arranged in each battery sequence 201. In actual production, the number of cells 100 and the number of battery sequences 201 may be assembly according to actual requirements. This is not specifically limited in the present disclosure.

A gap is provided between at least two adjacent cells 100. A ratio of the gap to the thickness of the cell 100 ranges from 0.001 to 0.15.

It should be noted that the gap between two adjacent cells 100 varies with an increase of an operating time of the cells 100. During operation, after operation, or before the cells 100 leave the factory, as long as the ratio of the gap between the cells 100 to the thickness falls within the scope defined in the present disclosure, the gap falls within the protection scope of the present disclosure.

Two opposite surfaces of the cells 100 in the thickness direction have largest areas, and the cells 100 are arranged along the thickness direction. In other words, the cells 100 are arranged in sequence with larger surfaces facing each other. Since the surfaces with larger areas are more likely to expand, reserving a certain gap between the cells 100 can provide a cushion space for expansion of the cells 100.

The expansion of the cells 100 is related to the thicknesses of the cells 100. A cell 100 with a larger thickness is more likely to expand. In the present disclosure, the ratio of the gap between the cells 100 to the thickness of the cell 100 is defined as 0.001-0.15. In this way, a space of the battery pack 200 can be fully used, thereby improving a utilization of the battery pack 200, and relatively effective cushion can be provided for the expansion of the cells 100.

In addition, heat is generated when the cell 100 expands. Therefore, the gap reserved between the cells 100 can be used as a heat dissipation channel, such as an air channel, so that heat of the surface of the cell 100 with a larger area can be dissipated more effectively. In this way, heat dissipation efficiency of the battery pack 200 can be further improved, and the safety of the battery pack 200 can be provided.

In the above solution, the gap between the cells 100 may mean that a certain space is simply reserved between the cells 100 and no structural member is arranged between the cells, or may mean that an additional structural member is arranged between the cells 100 to separate the cells 100 from each other.

It should be noted that, when a structural member is arranged between the cells 100, the gap between the cells 100 is understood as a distance between the cells 100 on two sides of the structural member rather than a distance between the structural member and each cell 100.

It should be noted that, a certain gap may be reserved between the structural member and each of the cells 100 on the two sides of the structural member, or the structural member may be in direct contact with the cells. When the structural member is in direct contact with the cells 100 arranged on the two sides, the structural member is required to have a certain flexibility, so as to provide cushion for the expansion of the cells 100. The structural member includes but is not limited to an aerogel, a thermally conductive structural adhesive, or a thermal insulation foam.

In the present disclosure, when multiple battery sequences 201 are arranged, the gap means a distance between two adjacent cells 100 in a same battery sequence 201 rather than a distance between two adjacent cells in different battery sequences 201. In addition, in the same battery sequence 201, a certain gap may be reserved between every two adjacent cells, or a certain gap may be reserved between some two adjacent cells.

In this embodiment, at least one of the cells 100 includes a metal shell 101 and electrode cores 102 packaged in the metal shell 101. An air pressure inside the metal shell 101 is lower than an air pressure outside the metal shell 101. That is to say, the inside of the metal shell 101 is in a negative pressure state.

In the present disclosure, "air pressure" is an abbreviation for atmospheric pressure, and is an atmospheric pressure acting on a unit area, which is equal to a weight of a vertical column of air extending upward to an upper boundary of the atmosphere on a unit area.

In this implementation, the metal shell 101 has high strength and effective heat dissipation. The metal shell 101 may include but is not limited to an aluminum shell or a steel shell.

When a gap between the metal shell 101 and the electrode cores 102 is relatively large, if the cell 100 vibrates or bumps, the electrode cores 102 tend to move arbitrarily in the metal shell 101, and the electrode cores 102 move relative to each other, causing damage to the electrode cores 102. For example, a current collector is damaged, a separator film is wrinkled, an active material layer on a plate is peeled off, stability of the cell 100 relatively poor, and safety events such as a short circuit between a positive electrode and a negative electrode is easily caused. In the present disclosure, since the metal shell 101 is arranged to a special negative pressure state, the metal shell 101 is recessed or deformed under the action of the atmospheric pressure, so that the gap between the metal shell 101 and the electrode cores 102 decreases. Therefore, a space for arbitrary movement of the electrode cores 102 or the displacement relative to each other is reduced, thereby reducing the arbitrary movement of the electrode cores 102 and the displacement of the electrode cores 102 relative to each other. In this way, the stability of the cell 100 is improved, the strength of the cell 100 is increased, and the safety of the cell 100 is enhanced.

In addition, in this embodiment of the present disclosure, the largest surface of the cell 100 and the largest surface of the adjacent cell 100 are arranged facing each other. That is to say, when the multiple cells 100 are arranged in sequence along the thickness direction, the cells 100 are arranged with largest faces facing each other. In an embodiment, since the inside of the metal shell 101 is under negative pressure, a largest surface of the metal shell 101 is easily recessed into the metal shell 101. The recess may be a recess formed on the surface of the metal shell 101 during a vacuuming operation on the metal shell 101 of the cell 100. It is known that during normal use of the cell, the cell usually expands as result of expansion of a material of the cell, gas production by an electrolyte solution, and the like, and the largest surface of the cell usually expands and deforms most greatly. In this technology, the largest surface of the cell in an initial state is defined in a slightly recessed state by vacuuming. In this way, squeeze between the cells after the cells expand can be effectively relieved, thereby increasing lives and safety of the cells and the entire system.

In addition, in this method, multiple electrode cores 102 can be packaged in a metal shell 101, so that a relatively long cell 100 can be manufactured more conveniently. Therefore, by using the technical solution of the present disclosure, a relatively long cell 100 with relatively large strength can be easily realized. Thus, when the cell 100 is mounted in a housing of the battery pack 200, support structures such as cross bars and longitudinal bars are not required in the battery pack body, and the cell 100 is directly mounted to the housing of the battery pack 200 and supported by the metal shell 101 of the cell 100, thereby reducing a space occupied in an internal space of the battery pack 200, improving a volume utilization of the battery pack 200, and helping reduce a weight of the battery pack 200.

One or more electrode cores 102 may be packaged in the metal shell 101. The multiple electrode cores 102 may be connected in series or in parallel with each other.

The electrode core 102 includes an electrode assembly formed by winding or stacking a positive plate, a separator film, and a negative plate. The electrode core 102 further includes an electrolyte solution.

In some implementations, the air pressure inside the metal shell 101 ranges from −100 Kpa to −5 Kpa. Further, the air pressure inside the metal shell ranges from −90 Kpa to −20 Kpa. Certainly, those skilled in the art may assembly the air pressure inside the metal shell 101 according to actual requirements.

In some implementations of the present disclosure, a thickness of the metal shell 101 ranges from 0.05 mm to 1 mm.

A relatively large thickness of the metal shell 101 increases the weight of the cell 100 and reduces the capacity of the cell 100. In addition, due to the excessively large thickness of the metal shell 101, the metal cannot be easily recessed or deformed toward the electrode core 102 under the action of the atmospheric pressure. As a result, the distance between the metal shell 101 and the electrode core 102 cannot be reduced, and the electrode core 102 cannot be effectively positioned. Moreover, the excessively large thickness of the metal shell 101 increases costs for air extraction, thus increasing manufacturing costs.

In the present disclosure, by defining the thickness of the metal shell 101 in the above range, not only strength of the metal shell 101 can be ensured, but also the capacity of the cell 100 is prevented from reduction. Moreover, the metal shell 101 can be deformed more easily in the negative pressure state, so that the distance between the metal shell 101 and the electrode core 102 can be reduced, thereby reducing arbitrary movement of the electrode core 102 inside the metal shell 101 and displacement of the electrode cores 102 relative to each other.

In some implementations of the present disclosure, the metal shell 101 includes a shell body 1012 with an opening and an end cover 1011. The end cover 1011 is hermetically connected with the opening of the shell body 1012 to jointly define a hermetical accommodating chamber. The electrode core 102 is arranged in the accommodating chamber.

The gap between the two cells 100 includes a first gap S. The first gap S is a minimum distance between the two end covers 1011 of the two adjacent cells 100 along the first direction A. The thickness of the cell 100 is a dimension of the end cover 1011 along the first direction A. A ratio of the first gap to the thickness of the cell 100 ranges from 0.005 to 0.1.

In the above implementation, since the end cover 1011 has relatively high strength, the end cover is less likely to expand than the shell body 1012. After the cell 100 operates for a period of time, a chemical reaction occurs inside the cell, and the cell 100 expands and squeezes an adjacent cell 100, and therefore the first gap S changes (for example, the first gap gradually increases). However, the change is relatively small and can be ignored. Alternatively, even if the first gap changes, the ratio of the first gap S to the thickness of the cell 100 still satisfies the above range. In the above implementation, two ends of the shell body 1012 each are provided with the end cover 1011. When the cells 100 are arranged into the battery sequence 201 along the thickness direction, the gap between the two cells 100 is a minimum distance between two end covers 1011 arranged on a same end of the battery sequence 201 rather than a distance between two end covers 1011 arranged on different ends of the cells 100.

In the above implementation, one end of the shell body 1012 may be open, and a first electrode 1021 and a second electrode 1022 are led out through a same side. Alternatively, the two ends of the shell body 1012 both may be open.

Figure 1:
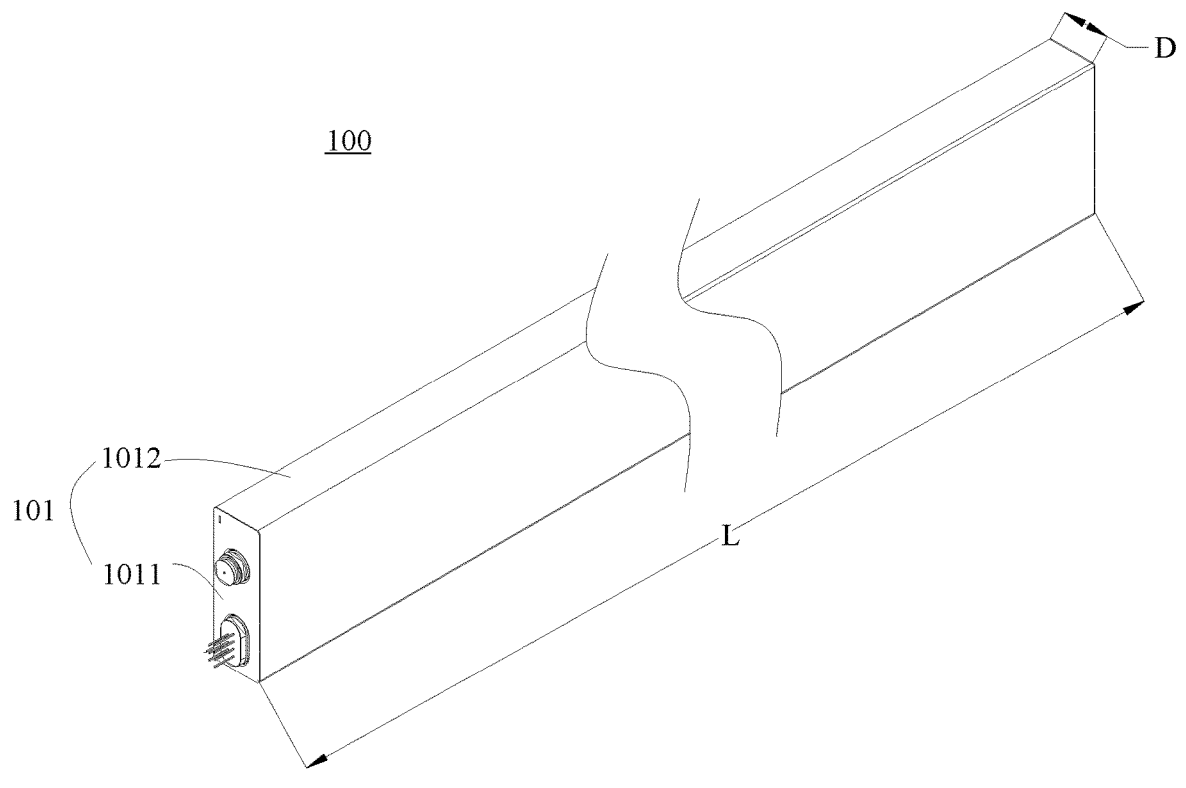
FIG. 1 is a schematic structural diagram of a cell according to an implementation of the present disclosure.
Figure 2:
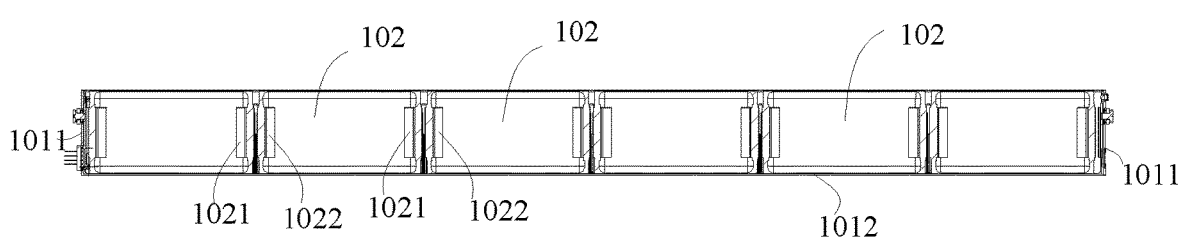
FIG. 2 is a schematic connection diagram of electrode cores inside the cell according to an implementation of the present disclosure.
Figure 3:
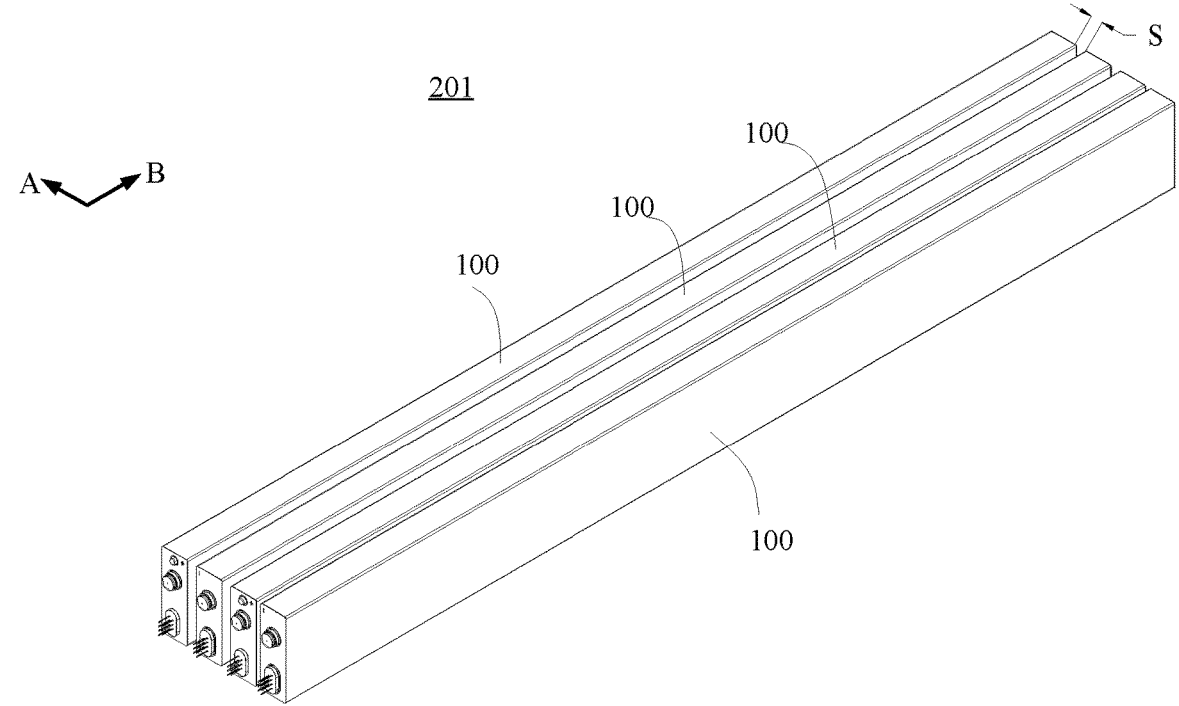
FIG. 3 is a schematic structural diagram of a battery sequence according to an implementation of the present disclosure.

As shown in FIG. 2, the first electrode 1021 and the second electrode 1022 are respectively led out through the end covers 1011 arranged on the two ends of the shell body 1012.

In some implementations of the present disclosure, the metal shell 101 includes a shell body 1012 with an opening and an end cover 1011. The end cover 1011 is hermetically connected with the opening of the shell body 1012 to jointly define a hermetical accommodating chamber. The electrode core 102 is arranged in the accommodating chamber. The shell body 1012 has two opposite first surfaces along the first direction A. The gap between the two adjacent cells 100 includes a second gap. The second gap is a minimum distance between the two first surfaces of the shell bodies 1012 of the two adjacent cells 100 facing each other. The thickness of the cell 100 is a dimension of the end cover 1011 along the first direction.

The second gap between the cells 100 before use is larger than the second gap between the cells 100 after use.

The expression "before use" mentioned herein may be understood as a time point before the cell 100 is delivered from the factory after assembly or before the cell starts supplying electric energy to the outside after the cell is delivered from the factory. The expression "after use" mentioned herein may be understood as a time point after the cell 100 starts supplying electric energy to the outside. For example, the battery pack 200 is assembled on an electric vehicle 300. In this case, the state before use may be understood as a state of the new vehicle, and the state after use may be understood as a state of the vehicle after traveling by a mileage.

In this implementation, the second gap is a minimum distance between two opposite first surfaces of two adjacent cells 100, and the distance gradually decreases with a service time of the cells. A main reason is that after the cells expand, the distance between two adjacent largest surfaces gradually decreases.

In some implementations of the present disclosure, the metal shell 101 has two opposite first surfaces along the first direction A, and at least one of the first surfaces is recessed into the metal shell 101. FIG. 6 shows recessed regions 1013 of the metal shell. Since the metal shell 101 is recessed, the internal electrode core 102 is partly held securely, so that the internal electrode core 102 can be effectively prevented from arbitrarily moving during production and use of the cell, thereby improving safety of the cell. Preferably, the first surfaces are both recessed into the metal shell 101, so that the electrode core 102 can be positioned more effectively by the metal shell 101. In an embodiment, the metal shell 101 is pressed against an outer surface of the electrode core 102 along the first direction A to hold the electrode core 102, so as to prevent the electrode core 102 from moving arbitrarily.

In some implementations, a gap is provided between the electrode core 102 and an inner surface of the metal shell 101 before the metal shell 101 is vacuumized. The gap facilitates mounting of the electrode cores 102 into the metal shell 101. After the metal shell 101 is evacuated, the metal shell 101 is pressed against the outer surface of the electrode core 102 along the first direction A to hold the electrode core 102, so as to reduce a space inside the metal shell 101 for the arbitrary movement of the electrode core 102, thereby improving the safety of the cell 100.

In some implementations of the present disclosure, multiple electrode cores 102 are packaged in the metal shell 101. The multiple electrode cores 102 are divided into multiple electrode core assemblies 1023. The electrode core assemblies 1023 are connected in series.

Figure 4:
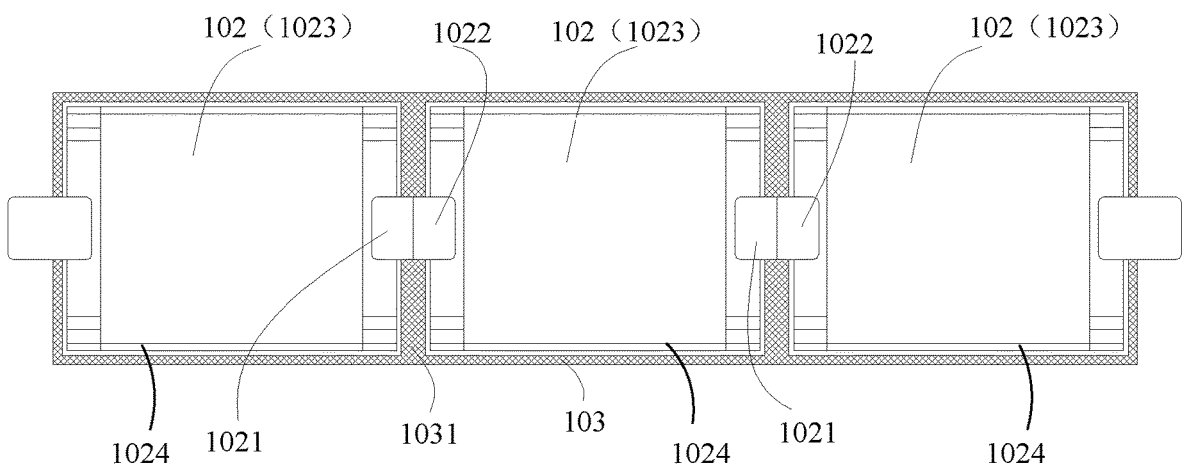
FIG. 4 is a schematic structural diagram of a metal shell of the cell according to an implementation of the present disclosure, where a packaging film for the multiple electrode cores are integral.
Figure 5:
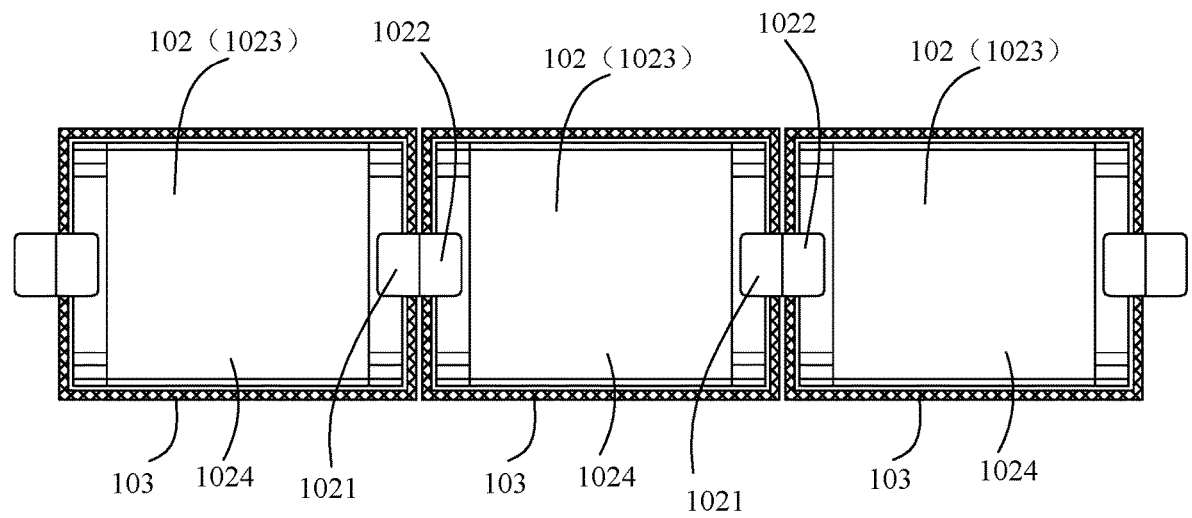
FIG. 5 is a schematic structural diagram of the metal shell of the cell according to an implementation of the present disclosure, where the packaging film is a split type.

In other words, multiple electrode core assemblies 1023 are connected in series in the metal shell 101, and each electrode core assembly 1023 includes at least one electrode core 102. In this way, the capacity of the cell 100 can be increased, and manufacturing costs of the cell 100 can be reduced. As shown in FIG. 2, FIG. 4, and FIG. 5, the electrode core assembly 1023 includes only one electrode core 102.

In this implementation of the present disclosure, each electrode core assembly 1023 has a first electrode 1021 and a second electrode 1022 configured to lead out a current, and the multiple electrode core assemblies 1023 are connected in series. That is to say, the first electrode 1021 of an electrode core assembly 1023 is electrically connected with the second electrode 1022 of an adjacent electrode core assembly 1023. In this technology, the electrode cores 102 are connected in series, so that the capacity and the voltage can be increased through only one cell, thereby reducing the manufacturing processes and costs.

The multiple electrode core assemblies 1023 are arranged in a second direction B perpendicular to the first direction A (that is, the thickness direction of the cell 100), and the length of the cell 100 extends along the second direction B. That is to say, the multiple electrode core assemblies 1023 are arranged in sequence along the length direction of the cell 100, and a length of the electrode core assembly 1023 also extends along the second direction B. The first electrode 1021 and the second electrode 1022 of the electrode core assembly 1023 are respectively arranged on two sides of the electrode core assembly 1023 along the second direction B. That is to say, the multiple electrode core assemblies 1023 are in a "head-to-head" arrangement. This arrangement can facilitate series connection of the electrode core assemblies 1023 in pairs, and realizes a relatively simple connection structure. In addition, this arrangement can facilitate manufacturing of a relatively long cell 100.

The length of the cell ranges from 400 mm to 2500 mm (millimeters), for example, may be 500 mm, 1000 mm, 1500 mm, or the like. Compared with the related art in which only one electrode core 102 is arranged, arranging multiple electrode core assemblies 1023 in the cell can facilitate manufacturing of a relatively long cell. Conventionally, a copper-aluminum foil in a relatively long cell 100 used as a current collector is relatively long, which greatly increases an internal resistance of the cell and cannot satisfy current requirements for increasing power and fast charging. In case of a same cell length, this embodiment can further greatly reduce the internal resistance of the cell to avoid problems such as overheating of the cell caused during high power outputting, fast charging, or the like.

In some implementations of the present disclosure, the electrode core assemblies 1023 are connected in series to form an electrode core string. The first electrode 1021 of one of the two electrode core assemblies 1023 respectively arranged on a head end and a tail end of the electrode core string and the second electrode 1022 of the other of the electrode core assemblies 1023 are respectively led out along the second direction B through two ends of the metal shell 101. That is to say, the current of the cell 100 is led out through the two ends of the metal shell 101. Leading out the current through the two ends can reduce a flowing path of the current and reduce the internal resistance of the cell in a case that the length of the cell 100 is relatively large.

In some implementations of the present disclosure, the thickness of the cell 100 is greater than 10 mm. In other embodiments, the thickness of the cell 100 ranges from 13 mm to 75 mm.

In some implementations of the present disclosure, a packaging film 103 is further arranged between the metal shell 101 and the electrode core 102. The electrode core 102 is packaged in the packaging film 103.

That is to say, the electrode core 102 is first packaged in the packaging film 103, and then metal shell 101 is sleeved outside the packaging film 103, to realize secondary packaging of the electrode core 102, thereby improving hermeticity of the cell 100. It may be understood that the packaging film 103 is further filled with an electrolyte solution. In this way, contact between the electrolyte solution and the metal shell 101 can be prevented, thereby preventing corrosion of the metal shell 101 or decomposition of the electrolyte solution.

In some implementations, multiple electrode cores 102 are arranged. The multiple electrode cores 102 are divided into multiple electrode core assemblies 1023. The electrode core assemblies 1023 are connected in series. The multiple electrode core assemblies 1023 connected in series are packaged in one packaging film 103. Each electrode core assembly 1023 includes an electrode core assembly body 1024 and a first electrode 1021 and a second electrode 1022 configured to lead out a current and connected with the electrode core assembly body 1024. A joint of the first electrode 1021 of one of two electrode core assemblies 1023 connected in series and the second electrode 1022 of the other of the electrode core assemblies is arranged in the packaging film 103.

In other words, the packaging film 103 is integrally arranged, and the multiple electrode cores 102 are packaged in the one packaging film 103. The electrode cores 102 are divided into multiple electrode core assemblies 1023. Each electrode core assembly 1023 includes at least one electrode core 102. The multiple electrode cores 102 in a same electrode core assembly 1023 are connected in parallel, and the electrode core assemblies 1023 are connected in series. In this way, the capacity of the cell can be increased, and the manufacturing costs can be reduced.

It should be noted that the series connection in this embodiment may be a series connection between adjacent electrode core assemblies 1023. In a specific implementation, the first electrodes 1021 on adjacent electrode core assemblies 1023 may be connected and the second electrodes 1022 on adjacent electrode core assemblies may be connected directly or by an additional conductive member. Generally, the electrode core assemblies 1023 each includes the first electrode 1021 and the second electrode 1022 configured to lead out a current. If the electrode core assembly 1023 includes only one electrode core 102, the first electrode 1021 and the second electrode 1022 may be a positive tab and a negative tab of the electrode core 102 respectively, or may be the negative tab and the positive tab of the electrode core 102 respectively. If the electrode core assembly includes multiple electrode cores 102, the first electrode 1021 and the second electrode 1022 may be electrode leads. Alternatively, one of the first electrode 121 and the second electrode 122 is a lead-out member formed by combining and welding together the positive tabs of the multiple electrode cores 102, and the other electrode is a lead-out member formed by combining and welding together the negative tabs of the multiple electrode cores 102.

In the present disclosure, "first" of the first electrode 1021 and "second" of the second electrode 1022 are merely used to distinguish between names, and are not used to limit a quantity. For example, the first electrode 1021 may include one first electrode 1021, or may include multiple first electrodes 1021.

When the metal shell 101 includes multiple electrode cores 102, since negative pressure is provided inside the metal shell 101, the multiple electrode cores 102 can be effectively prevented from arbitrarily moving in the metal shell 101, thereby improving the safety of the cell 100.

In the above implementation, a packaging portion 1031 is formed at a position on the packaging film 103 corresponding to the first electrode 1021 and/or the second electrode 1022, to isolate two adjacent electrode core assembly bodies 1024. At least one of the first electrode 1021 of one of the two adjacent electrode core assemblies 1023 and the second electrode 1022 of the other of the two adjacent electrode core assemblies 1023 is arranged in the packaging portion 1031. Since the multiple electrode core assemblies 1023 are isolated by the packaging portion 1031, the electrolyte solutions of the multiple electrode core assemblies 1023 are prevented from circulating, and the multiple electrode core assemblies 1023 do not affect each other. In addition, the electrolyte solutions of the multiple electrode core assemblies 1023 are prevented from decomposing as a result of an excessively large potential difference, thereby ensuring the safety and the service life of the cell.

The packaging portion 1031 may be implemented in various ways. For example, the packaging portion 1031 may be formed by fastening a packaging film 103 with a tie. Alternatively, the packaging portion 1031 may be formed by directly thermally fusing and connecting the packaging film 103. A specific manner of forming the packaging portion 1031 is not particularly limited.

In this implementation, the multiple electrode core assemblies 1023 may share one packaging film 103. In this case, the packaging portion 1031 is arranged among all of the electrode core assemblies 1023. The packaging portion 1031 may be formed by thermally melting and connecting the packaging film 103 among the electrode core assemblies 1023. Specifically, the electrode core assembly 1023 has a first electrode 1021 and a second electrode 1022. Before the electrode core assemblies 1023 are packaged, the multiple electrode core assemblies 1023 are connected in series, and then the electrode core assemblies 1023 connected in series are wrapped by one packaging film 103. For example, the electrode core assemblies 1023 connected in series may be placed on a part of the packaging film 103, and an other part of the packaging film 103 is folded toward the electrode core assemblies 1023. Next, the packaging film 103 in the two regions are sealed by hot melting, so that the electrode core assemblies 1023 connected in series are packaged in the same packaging film 103. In addition, the packaging film 103 arranged in an upper region and a lower region between the electrode core assemblies 1023 are also hot-melted and extruded to form an integral member, thereby forming a separator between the electrode core assemblies 1023 to separate the electrode core assemblies 1023.

In some implementations of the present disclosure, multiple electrode cores 102 are arranged. The multiple electrode cores 102 are divided into multiple electrode core assemblies 1023. Multiple packaging films 103 are arranged. Each electrode core assembly 1023 includes at least one electrode core 102. One electrode core assembly 1023 is packaged in each packaging film 103 to form an electrode core assembly. The electrode core assemblies are connected in series.

In other words, a number of packaging films 103 and a number of electrode core assemblies 1023 are in a one-toone correspondence. Each electrode core assembly 1023 is independently packaged in one packaging film 103. In this implementation, after the multiple electrode core assemblies 1023 are manufactured, one packaging film 103 may be sleeved outside each electrode core assembly 1023, and then the electrode core assemblies are connected in series.

The packaging films 103 of the multiple electrode core assemblies 1023 are independent of each other, that is, each electrode core assembly 1023 is independently packaged by using one packaging film 103. In this case, the first electrode 1021 and the second electrode 1022 of the electrode core assembly 1023 are respectively led out through two ends of the electrode core assembly 1023 along the second direction B. After each electrode core assembly 1023 is packaged by the packaging film 103, the electrode core assemblies are connected in series by the first electrode 1021 and the second electrode 1022 that are drawn out.

In this implementation of the present disclosure, an air pressure between the metal shell 101 and the packaging film 103 is P1. An air pressure inside the packaging film 103 is P2. P1 and P2 satisfy: P1>P2. P1/P2 ranges from 0.05 to 0.85.

That is to say, the inside of the packaging film 103 may be a negative pressure state, which facilitates closer attachment between the packaging film 103 and the electrode core 102, and increases the strength of the cell 100.

In some specific implementations, a value of P1 ranges from −100 Kpa to −5 Kpa, and a value of P2 ranges from −100 Kpa to −20 Kpa. In an embodiment, the value of P1 ranges from −75 Kpa to −20 Kpa.

P1, P2, and P1/P2 are defined within the above range, and in the technology, the electrode core 102 adopts a secondary sealing mode. The electrode core 102 is first packaged in the packaging film 103. In order to avoid damage to the packaging film 103 as a result of bulging of the packaging film 103 caused by an excessive internal air pressure, the air pressure between the metal shell 101 and the packaging film 103 is required to be greater than the air pressure inside the packaging film 103. It has been verified through a large number of experiments that, when P1/P2 is within the above range, the reliability of the secondary sealing of the battery is ensured more effectively. In addition, an interface between the battery plates is ensured, a gap between the plates is reduced, so that lithium ions can be conducted more effectively.

In this embodiment of the present disclosure, the packaging film 103 includes an outer film layer and an inner film layer that are stacked. The inner film layer is wrapped around a periphery of the electrode core 102, and the outer film layer is wrapped around the inner film layer, that is, the inner film layer is arranged between the outer film layer and the electrode core 102.

The inner film layer has relatively desirable chemical stability, for example, may be made of a material having resistance to corrosion by an electrolyte solution. For example, the material may be polypropylene, polyethylene (PE), or polyethylene terephthalate (PET), or may be a combination of more than one of the above materials.

The outer film layer is a protective layer. By using the outer film layer, penetration of air, especially water vapor, oxygen, and the like can be prevented. The material of the outer film layer may be, for example, PET, polyamide, or PP, or may be a combination of more than one of the above materials.

In this embodiment of the present disclosure, a melting point of the outer film layer is higher than a melting point of the inner film layer, so that the outer film layer is not melted during sealing by hot melting, and the inner film layer can be melted in time to ensure excellent hermeticity. In an embodiment, a difference between the melting point of the outer film layer and the melting point of the inner film layer ranges from 30° C. to 80° C. For example, the difference between the two melting points may be 50° C., 70° C., or the like. A specific material may be determined according to an actual need.

In this embodiment of the present disclosure, the non-metallic outer film layer and the non-metallic inner film layer are bonded and combined by an adhesive. The specific adhesive may be selected according to properties of the non-metallic outer film layer and the non-metallic inner film layer. For example, a combination of PP and PET films are used. Due to poor compatibility thereof, the PP film and the PET film are easily delaminated. Therefore, preferably, polyolefin adhesives are used for bonding to form a composite film.

In this embodiment, a double-layer non-metallic film 103 is used to form a packaging film to package the electrode core 102. Since the non-metallic packaging film 103 has a higher tensile strength and a higher elongation at break, limitation on the thickness of the cell 100 can be reduced, so that the produced cell 100 has a larger thickness. The thickness of the cell 100 in this embodiment may be expanded by a wide range. For example, the thickness may be greater than 10 mm, for example, may range from 13 mm to 75 mm.

In some implementations of the present disclosure, the packaging film may be an aluminum-plastic film.

In some implementations of the present disclosure, an exhaust hole is provided on the metal shell 101. The metal shell 101 is vacuumized through the exhaust hole, so that a negative pressure state is formed in the metal shell 101. After the vacuumization, the exhaust is required to be sealed. In this embodiment of the present disclosure, a sealing member is arranged in the exhaust hole, to block the exhaust hole.

The sealing member may be a plug, a rubber seal, or other structural members, which is not specifically limited in the present disclosure.

In this embodiment of the present disclosure, the battery pack 200 further includes a battery pack cover (not shown) and a tray 202. The battery pack cover and the tray 202 are hermetically connected to form an accommodating cavity, and the battery sequence 201 is accommodated in the accommodating cavity. The tray 202 includes a support member, and a support region is formed on the metal shell 101 of the cell 100. The cell 100 is butted with the support member through the support region and is supported on the support member.

In an embodiment, the tray 202 includes a side beam, and two ends of the cell 100 along the second direction B are supported on the side beam.

Therefore, in the present disclosure, the cell 100 may be directly fixed on the tray 202 by virtue of the strength of the cell 100, without a need to arrange additional cross beams or longitudinal beams on the tray 202 to support the cell 100. In this way, a space utilization of the battery pack 200 can be improved.

In an embodiment of the present disclosure, the cell 100 is a lithium-ion cell.

Another aspect of the present disclosure provides an electric vehicle 300, including the above battery pack 200. The electric vehicle 300 in the present disclosure has a high mile range and low costs.

In the description of the present disclosure, it should be noted that unless otherwise explicitly specified or defined, the terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

In description of this specification, description of reference terms such as "an embodiment", "specific embodiments", or "an example", means including specific features, structures, materials, or features described in the embodiment or example in at least one embodiment or example of the present disclosure. In this specification, schematic descriptions of the foregoing terms do not necessarily point at a same embodiment or example. Moreover, the specific features, structures, materials, or characteristics described may be combined in any one or more embodiments or examples in an appropriate manner.

Although the embodiments of the present disclosure have been shown and described, a person of ordinary skill in the art should understand that various changes, modifications, replacements, and variations may be made to the embodiments without departing from the principles and spirit of the present disclosure, and the scope of the present disclosure is as defined by the appended claims and their equivalents.

What is claimed is:

1. A battery pack, comprising a battery sequence, wherein the battery sequence comprises a plurality of cells;
   a thickness of each cell extends along a first direction; the plurality of cells are arranged in sequence along the first direction to form the battery sequence;
   at least one of the cells comprises a metal shell and an electrode core packaged in the metal shell; an air pressure inside the metal shell is lower than an air pressure outside the metal shell;
   a gap is provided between at least two adjacent cells; and a ratio of the gap to the thickness of the at least one cell ranges from 0.001 to 0.15,
   wherein a packaging film is further arranged between the metal shell and the electrode core; and the electrode core is packaged in the packaging film,
   wherein an air pressure between the metal shell and the packaging film is P1; an air pressure inside the packaging film is P2; P1 and P2 satisfy: P1>P2; and P1/P2 ranges from 0.05 to 0.85.

2. The battery pack according to claim 1, wherein the air pressure inside the metal shell ranges from −100 Kpa to −5 Kpa.

3. The battery pack according to claim 2, wherein the air pressure inside the metal shell ranges from −90 Kpa to −20 Kpa.

4. The battery pack according to claim 1, wherein a thickness of the metal shell ranges from 0.05 mm to 1 mm.

5. The battery pack according to claim 1, wherein the metal shell comprises a shell body with an opening and an end cover; the end cover is hermetically connected with the opening of the shell body to jointly define a hermetical accommodating chamber; the electrode core is arranged in the accommodating chamber;
   the gap between the at least two adjacent cells comprises a first gap; the first gap is a minimum distance between the two end covers of the at least two adjacent cells along the first direction; the thickness of the at least one cell is a dimension of the end cover along the first direction; and a ratio of the first gap to the thickness of the at least one cell ranges from 0.005 to 0.1.

6. The battery pack according to claim 1, wherein the metal shell comprises a shell body with an opening and an end cover; the end cover is hermetically connected with the opening of the shell body to jointly define a hermetical accommodating chamber; the electrode core is arranged in the accommodating chamber;
   the shell body has two opposite first surfaces along the first direction;
   the gap between the at least two adjacent cells comprises a second gap; the second gap is a minimum distance between the two first surfaces of the shell bodies of the at least two adjacent cells facing each other; and the thickness of the at least one cell is a dimension of the end cover along the first direction.

7. The battery pack according to claim 1, wherein a second gap between the plurality of cells before use is larger than the second gap between the plurality of cells after use.

8. The battery pack according to claim 1, wherein the metal shell has two opposite first surfaces along the first direction; and at least one of the first surfaces is recessed into the metal shell.

9. The battery pack according to claim 8, wherein the two first surfaces are both recessed into the metal shell; and the metal shell is pressed against an outer surface of the electrode core along the first direction to hold the electrode core.

10. The battery pack according to claim 9, wherein a gap is provided between the electrode core and an inner surface of the metal shell before the metal shell is vacuumized; and the metal shell is pressed against the outer surface of the electrode core along the first direction to hold the electrode core after the metal shell is vacuumized.

11. The battery pack according to claim 1, wherein a plurality of electrode cores are packaged in the metal shell; the plurality of electrode cores are divided into a plurality of electrode core assemblies; and the electrode core assemblies are connected in series.

12. The battery pack according to claim 11, wherein a length of the at least one cell extends along a second direction; the length of the at least one cell ranges from 400 mm to 2500 mm; the plurality of electrode core assemblies are arranged along the second direction; a length of each electrode core assembly extends along the second direction; each electrode core assembly comprises a first electrode and a second electrode configured to lead out a current; and the first electrode and the second electrode are respectively arranged on two sides of the respective electrode core assembly along the second direction.

13. The battery pack according to claim 12, wherein the electrode core assemblies are connected in series to form an electrode core string; and the first electrode of one of two electrode core assemblies respectively arranged on a head end and a tail end of the electrode core string and the second electrode of the other of the electrode core assemblies are respectively led out along the second direction through two ends of the metal shell.

14. The battery pack according to claim 1, wherein the thickness (D) of the at least one cell is greater than 10 mm.

15. The battery pack according to claim 14, wherein the thickness (D) of the at least one cell ranges from 13 mm to 75 mm.

16. The battery pack according to claim 1, wherein a plurality of electrode cores are arranged; the plurality of electrode cores are divided into a plurality of electrode core assemblies; one packaging film is arranged; the electrode core assemblies are connected in series; the plurality of electrode core assemblies connected in series are packaged in the packaging film;

each electrode core assembly comprises an electrode core assembly body and a first electrode and a second electrode configured to lead out a current; and a joint of the first electrode of one of two electrode core assemblies connected in series and the second electrode of the other of the electrode core assemblies is arranged in the packaging film.

17. The battery pack according to claim 16, wherein a packaging portion is formed on the packaging film at a position corresponding to the first electrode and/or the second electrode to isolate two adjacent electrode core assembly bodies; and at least one of the first electrode of one of two adjacent electrode core assemblies and the second electrode of the other of the electrode core assemblies is arranged in the packaging portion.

18. The battery pack according to claim 1, wherein a plurality of electrode cores are arranged; the plurality of electrode cores are divided into a plurality of electrode core assemblies; a plurality of packaging films are arranged; one electrode core assembly is packaged in each packaging film to form an electrode core assembly; and the electrode core assemblies are connected in series.

19. The battery pack according to claim 1, wherein a value of P1 ranges from −100 Kpa to −5 Kpa; and a value of P2 ranges from −100 Kpa to −20 Kpa.

20. The battery pack according to claim 19, wherein the value of P1 ranges from −75 Kpa to −20 Kpa.

21. The battery pack according to claim 1, wherein the packaging film comprises a non-metallic outer film layer and a non-metallic inner film layer that are stacked; the outer film layer is arranged between the metal shell and the inner film layer; a melting point of the outer film layer is greater than a melting point of the inner film layer; and a difference between the melting point of the outer film layer and the melting point of the inner film layer ranges from 30° C. to 80° C.

22. The battery pack according to claim 21, wherein the outer film layer is made of one or a combination of more than one of polyethylene terephthalate, polyamide, or polypropylene; and the inner film layer is made of one or a combination of more than one of polypropylene, polyethylene, or polyethylene terephthalate.

23. The battery pack according to claim 21, wherein the outer film layer and the inner film layer are bonded.

24. The battery pack according to claim 23, wherein a binder for the bonding is a polyolefin binder.

25. The battery pack according to claim 1, wherein the packaging film is an aluminum-plastic film.

26. The battery pack according to claim 1, wherein an exhaust hole is provided on the metal shell; and a sealing member is arranged in the exhaust hole.

27. The battery pack according to claim 1, further comprising a battery pack cover and a tray, wherein the battery pack cover and the tray are connected to form a battery accommodating cavity; the battery sequence is arranged in the battery accommodating cavity; the tray comprises a support member; a support region is formed on the metal shell; and the at least one cell is butted with the support member through the support region and is supported on the support member.

28. The battery pack according to claim 27, wherein the tray comprises a side beam; the side beam is a support member; and two ends of the at least one cell along the second direction are supported on the side beam.

29. An electric vehicle, comprising the battery pack according to claim 1.

* * * * *